UNITED STATES PATENT OFFICE.

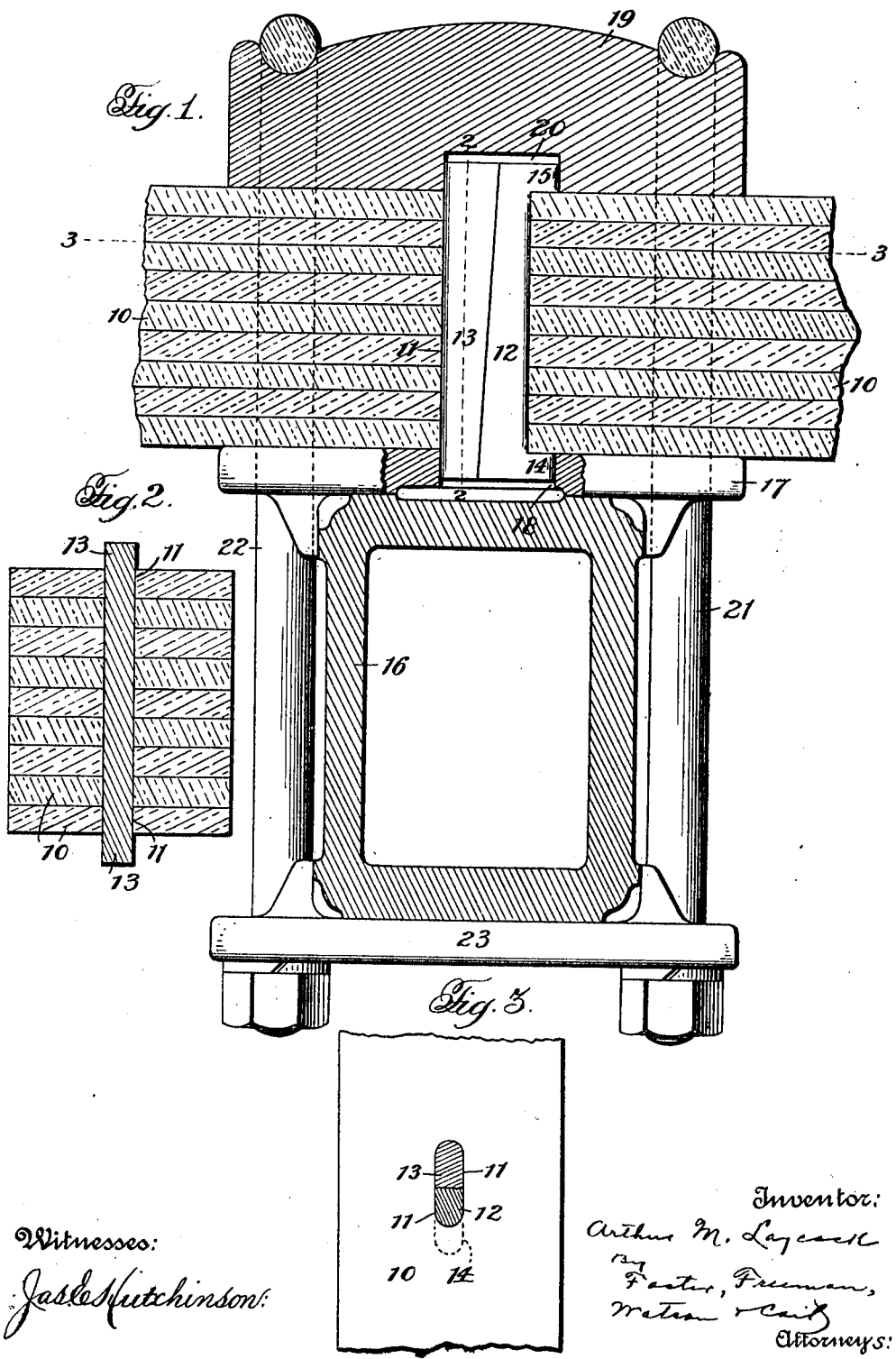

ARTHUR M. LAYCOCK, OF KINGSTON, PENNSYLVANIA.

FASTENING MEANS FOR LEAF-SPRINGS.

1,314,817.  Specification of Letters Patent.  Patented Sept. 2, 1919.

Application filed January 13, 1919. Serial No. 270,962.

*To all whom it may concern:*

Be it known that I, ARTHUR M. LAYCOCK, a citizen of the United States, and residing at Kingston, county of Luzerne, State of Pennsylvania, have invented certain new and useful Improvements in Fastening Means for Leaf-Springs, of which the following is a specification.

This invention relates to springs made up of a series of flat superimposed leaf spring members and has principal reference to the means for securing and holding the leaves together and in place on the axle of a vehicle. Its purposes, advantages and novel features will be apparent from the description taken with the drawings, but it may be stated in advance of the detailed description that it is designed to stand more efficiently the end thrust or shearing strains imparted by the different leaves when in use, to avoid trouble and expense in manufacture, to reduce the trouble in securing the leaves of the spring together and in place and to enable the leaves to be assembled and secured together before shipment, so that when received by the customer the spring is assembled ready to be secured to the axle.

In the drawings,

Figure 1 is a section longitudinally through a part of a leaf spring and across the axle on which it is mounted;

Fig. 2 is a cross section of the leaf spring itself and fastening pin on the line 2—2 of Fig. 1; and Fig. 3 is a horizontal section on the line 3—3 of Fig. 1.

As shown in the drawings, the leaf spring as is usual is made up of a number of flat parallel spring members 10 fitting on each other and as is well known the various leaves or members are ordinarily made of different lengths, the bottom member being shortest. Each of these spring members is provided with a central opening 11 which as shown in Fig. 3 has considerably greater diameter in the direction of the length of the leaf or member than transversely. The holes in the various leaves are of the same size and correspond, thus producing a continuous hole straight through the entire spring. A fastening means is inserted through this hole and it consists of two parts 12 and 13, the part 12 being provided at its ends with projecting ears 14 and 15 which extend over and lie close against the outer surfaces of the top and bottom spring leaf members, so as to hold them in position and prevent separation. The parts 12 and 13 are adapted to move longitudinally in reference to each other within the hole and their meeting faces are oppositely inclined, as clearly shown in Fig. 1, whereby in relative longitudinal movement they have a wedging action and together they completely fill the hole or opening 11. From this construction it will be understood that when the spring leaves are made and assembled, the part 12 is inserted through the hole and placed in the position shown in Fig. 1, and then the part 13 is driven into position thus locking the various members of the spring together in form for direct application to the axle of a vehicle. The spring may be shipped in this complete form and it will be noted that the elongation of the opening 11 with the closely fitting fastening means, will tend to prevent the leaves from turning upon each other with the fastening as a pivot.

When the spring is applied to an axle such as 16 shown in Fig. 1, it is placed on a spring seat 17 which is provided with the central hole or depression 18 which fits over the projecting ends of the parts 12 and 13 and this tends to aid in locking the spring in place. A top plate 19 fits on top of the spring and is provided with a depression 20, which fits over the projecting upper ends of the parts 12 and 13 just as in the case of the spring seat. The top plate, spring seat and axle may be secured together in any suitable way and in Fig. 1 there are shown the clips 21, 22 secured by nuts to the plate 23 below the axle.

Having thus described the invention what is claimed as new and desired to be secured by Letters Patent is:

1. In a device of the class described the combination with a series of superposed parallel leaf spring members having corresponding registering holes therethrough, of retaining means for said members extending through said holes composed of two parts longitudinally movable on and with reference to each other and frictionally engaging each other and the walls of said holes, one of said parts having at its ends means for engaging the outer spring members to prevent separation.

2. In a device of the class described the combination with a series of superposed parallel leaf spring members having corresponding registering holes therethrough, of retaining means for said members extending through said holes composed of two parts longitudinally movable on and with reference to each other and reversely tapered to cause a wedging action when moved longitudinally, one of said parts having ears or projections extending laterally close against the outer surfaces of the outer spring members and the two together filling and frictionally engaging opposite walls of said holes.

3. In a device of the class described the combination with a series of superposed parallel leaf spring members having corresponding registering holes therethrough of considerably greater diameter longitudinally of the members than transversely, of retaining means for said members extending through said holes composed of two parts in opposite ends of and filling said holes and having oppositely inclined meeting planes, one of said parts having at its ends means for engaging the outer spring members to prevent separation.

4. In a device of the class described the combination with a series of superposed parallel leaf spring members having corresponding registering holes therethrough of considerably greater diameter longitudinally of the members than transversely, of retaining means for said members extending through said holes composed of two parts in opposite ends of and filling said holes and having oppositely inclined meeting planes, one of said parts having at its ends ears or projections extending over and close against the outer surfaces of the outer spring members.

5. In a device of the class described the combination with a series of superposed parallel leaf spring members having corresponding registering holes therethrough, of retaining means for said members extending through said holes composed of two parts longitudinally movable on and with reference to each other and reversely tapered to cause a wedging action when moved longitudinally, one of said parts having ears or projections extending laterally close against the outer surfaces of the outer spring members and the two together filling and frictionally engaging opposite walls of said holes, a spring seat on which the bottom member of said series of springs rests provided with a depression or hole in which the projecting end of said retaining means fits, a top plate fitting the upper member provided with a depression to receive the upper projecting end of the retaining means and means for clamping said top plate spring members and spring seat together.

In testimony whereof I affix my signature.

ARTHUR M. LAYCOCK.

Copies of this patent may be obtained for five cents each, by addressing the "Commissioner of Patents, Washington, D. C."